(12) United States Patent
Ückert et al.

(10) Patent No.: US 10,661,886 B2
(45) Date of Patent: May 26, 2020

(54) WING STRUCTURE FOR FLYING OBJECTS

(71) Applicant: DEUTSCHES ZENTRUM FÜR LUFT- UND RAUMFAHRT E.V., Köln (DE)

(72) Inventors: Christian Ückert, Stade (DE); Tobias Bach, Braunschweig (DE); Olaf Steffen, Hamburg (DE); Denise Düring, Braunschweig (DE); Robert Kaps, Schwülper (DE); Markus Kleineberg, Hemmingen (DE); Christian Hühne, Hannover (DE)

(73) Assignee: DEUTSCHES ZENTRUM LUFT- UND RAUMFAHRT E.V., Cologne (DE)

( * ) Notice: Subject to any disclaimer, the term of this patent is extended or adjusted under 35 U.S.C. 154(b) by 406 days.

(21) Appl. No.: 15/564,520

(22) PCT Filed: Apr. 6, 2016

(86) PCT No.: PCT/EP2016/057513
§ 371 (c)(1),
(2) Date: Oct. 5, 2017

(87) PCT Pub. No.: WO2016/162374
PCT Pub. Date: Oct. 13, 2016

(65) Prior Publication Data
US 2018/0072401 A1 Mar. 15, 2018

(30) Foreign Application Priority Data
Apr. 8, 2015 (DE) .................... 10 2015 105 298

(51) Int. Cl.
*B64C 3/48* (2006.01)
*B64C 3/28* (2006.01)
*B64C 3/36* (2006.01)

(52) U.S. Cl.
CPC .................. *B64C 3/48* (2013.01); *B64C 3/28* (2013.01); *B64C 3/36* (2013.01)

(58) Field of Classification Search
CPC ................ B64C 3/48; B64C 3/36; B64C 3/28
See application file for complete search history.

(56) References Cited

U.S. PATENT DOCUMENTS 4,252,287 A 2/1981 Zimmer
4,553,722 A * 11/1985 Cole .................... B64C 3/48
244/219

(Continued)

FOREIGN PATENT DOCUMENTS

DE 29 07 912 A1 9/1980
DE 10 2012 109 233 A1 4/2014

(Continued)

*Primary Examiner* — Valentina Xavier
(74) *Attorney, Agent, or Firm* — W&C IP (57) ABSTRACT

The invention relates to a wing structure (1) for flying objects, comprising a wing leading edge (4) and a wing box (2), wherein the wing leading edge should be arranged on the wing box in particular in a detachable manner. For this purpose, the wing leading edge is connected to the wing box within a joining segment (9) and to rib extensions (11) of the wing box by means of fastening element (12) near the nose segment (15) such that a fastening-free segment (14) extends on the top side (16) of the wing leading edge in order to compensate thermal deformation during flight.

15 Claims, 6 Drawing Sheets

(Type A)

(56) References Cited

U.S. PATENT DOCUMENTS

| | | | |
|---|---|---|---|
| 8,925,870 B1* | 1/2015 | Gordon | B64C 3/28 244/200 |
| 2008/0128553 A1 | 6/2008 | Brown et al. | |
| 2010/0065687 A1 | 3/2010 | Douglas | |
| 2013/0001360 A1 | 1/2013 | Wildman | |
| 2015/0048207 A1* | 2/2015 | Williams | B64C 3/00 244/123.7 |
| 2016/0185443 A1* | 6/2016 | Rawdon | B64C 3/48 244/219 |
| 2016/0244143 A1* | 8/2016 | Foster | B64C 3/26 |
| 2017/0327245 A1* | 11/2017 | Salisbury | B64F 5/10 |
| 2019/0002080 A1* | 1/2019 | Schlipf | B64C 3/28 |
| 2019/0176960 A1* | 6/2019 | McNaught | B64C 3/187 |

FOREIGN PATENT DOCUMENTS

| | | |
|---|---|---|
| EP | 2 130 762 A2 | 12/2009 |
| GB | 845 138 A | 8/1960 |

\* cited by examiner

Fig. 1

(Type A)

Fig. 2
(Type B)

WING STRUCTURE FOR FLYING OBJECTS

The invention relates to a wing structure for flying objects, having a wing leading edge and having a wing box. The invention likewise relates to an exchange method for exchanging a wing leading edge in this regard.

In the context of the present invention, the expression "wing structure" is to be understood to mean those elements of a flying object which are arranged so as to project from the fuselage of the flying object and which, during intended use of the flying object, are impinged on by air layers, whereby aerodynamic forces are generated. Accordingly, the airfoils in particular are a wing structure within the meaning of the present invention.

The profile surfaces of the wing structures of flying objects, such as for example airfoils of passenger aircraft, firstly have basically laminar boundary layers which, in the case of modern passenger aircraft, however abruptly change at an early stage into turbulent boundary layers. Here, a turbulent boundary layer of said type has a considerably increased friction resistance in relation to a laminar boundary layer. The instability of the boundary layer, which leads to the abrupt change, is promoted by shape deviations such as gaps and steps in the contour of the profile surface.

Admissible values for said shape deviations are for example 0.5 mm for steps counter to the flow direction and 0.1 mm for steps in the direction of the flow.

If such shape deviations are avoided in particular in the leading region of the aerodynamic functional surface, this leads to a later abrupt change of the flow from a laminar boundary layer to a turbulent boundary layer, and thus to an expanded region of the laminar flow around the profile. This in turn leads to a reduction in resistance and to a direct fuel saving, and an increased range of the aircraft.

To generate the lift required for compensating the mass force in the takeoff and landing phases, modern passenger aircraft require special devices on the airfoils, which are referred to as high-lift systems. If one considers the airflow in particular with regard to the laminarity of the boundary layer, the high-lift systems at the slat are of primary significance. Here, in the prior art, a distinction is made between two different embodiments:

a) the deployable slats and
b) the Krueger flaps.

In the case of the deployable slats, the tip of the wing is guided on rails and is deployed forward when required. In the retracted state, these leave a gap or an offset on the top side of the aerodynamic surface of the wing, such that, proceeding from said region, a laminar boundary layer is no longer possible. By contrast, the Krueger flaps do not disrupt the aerodynamic surface on the wing top side, because they are pivoted out from the bottom side of the slat.

The airfoil of a passenger aircraft basically has, as a main component, a wing box which has two diametrically opposite wing shells which are held by means of spars and ribs in the interior of the wing box and which serve here for maintaining the required profile contour of the wing. Here, the wing box commonly also forms an internally situated fuel tank. Fastened upstream of the wing box in the flow direction is the wing leading edge, which connects the outer flow surface of the wing box (formed by the wing shells) to the outer flow surface of the wing leading edge to form a flow profile, and which furthermore comprises the high-lift systems, which are provided in some aircraft, in the slat.

In a conventional passenger aircraft, the airfoil is generally manufactured from an aluminum material, wherein the structure of the wing leading edge is riveted to the structure of the wing box. Such a riveted connection is distinguished here by the fact that a corresponding bolt or a fastening means is led through the surface of the respective structure, wherein a corresponding closure is then provided on the outer edges. For this purpose, the wing leading edge and one of the wing shells of the wing box are arranged in an overlapping manner and are then connected by means of multiple riveted connections, wherein a riveted connection of said type constitutes an additional disruption to the flow surface and thus adversely affects the boundary layer. Thus, the rivet head on the flow surface promotes the sudden change from the laminar boundary layer to a turbulent boundary layer, such that a riveted connection of said type in the slat region should basically be avoided.

Efforts are duly being made to form the airfoils, in particular the wing leading edge and the wing box with the wing shells, in an integral manner, such that the wing leading edge and the wing box are manufactured from a single component. This would have the advantage that the flow surface would be free from disruptions, which would basically have a positive effect on the laminar flow. However, the wing leading edge of a passenger aircraft is particularly exposed to damage, such that so-called bird strikes, that is to say collisions with birds, commonly occur, which lead to damage to the structure of the wing leading edge. In the case of such an integral design, the leading edge would now no longer be exchangeable, such that either the damaged structure would have to be repaired, or the entire wing would have to be exchanged. Owing to the fact that a wing however contains important elements such as for example a fuel tank, the complete exchange of a wing cannot be economically justified only on the basis of damage to the wing leading edge.

For this reason, despite the described problem in the case of the differential design of an airfoil, and despite the obvious advantages of an integral design, the differential design is preferred from economical aspects alone, because it is only in this way that an exchange of a wing leading edge is possible with adequate outlay.

A further possibility for saving fuel and thus possibly increasing the range of the aircraft consists in reducing the overall weight of the aircraft. Here, owing to the high strength and stiffness and the at the same time very low weight, fiber composite materials, such as for example carbon fiber composite materials, can nowadays no longer be dispensed with in the aerospace sector. Here, even structure-critical components are increasingly being produced from said material in order to save weight. Great efforts are therefore being made to produce the airfoils of aircraft, in particular of passenger aircraft, entirely from a fiber composite material, because the overall weight of an aircraft can be significantly reduced in this way.

If one adheres to the differential design and the logical use of fiber composite materials, there is a need for new connection mechanisms for connecting the individual components. This applies in particular if, aside from the logical use of fiber composite materials or lightweight materials, it is also sought to satisfy the laminarity criteria.

From DE 10 2012 109 233 A1, it is known to fasten the wing leading edge to the wing box with the aid of internally situated fastening means, wherein the wing leading edge is attached to the rib extensions of the wing box. In the region of the transition between wing leading edge and wing shell of the wing box, provision is furthermore made for an L-profile to be fastened to the wing leading edge by means of a riveted connection, in order to thereby fasten the wing leading edge to the wing box in the transition region. Here, the connection between wing leading edge and L-profile is displaced under the wing skin of the wing box, and is thus covered by the wing shell. Any surface offset that is formed can be filled with a filler material.

According to the present state of knowledge, for a wing leading edge composed of a fiber composite material, a metallic erosion protection means is required on the outer side of the wing leading edge in order to protect the structure of the wing leading edge. Such a metallic erosion protection means as a protective layer on the outer side may for example be a steel foil which protects the underlying structural layer of the wing leading edge composed of a fiber composite material. The different ambient temperatures that arise during the operation of the aircraft however lead to thermal deformation of the component over the temperature range, because the outer metallic layer exhibits a greater coefficient of thermal expansion than the underlying structural layer. In the event of an increase in temperature, the outer metallic layer expands, such that the contour of the wing leading edge changes. In the case of the connection of the wing leading edge to the rib connections of the wing box, constraining forces can thus arise during the operation of the aircraft, which forces change the flow surface of the wing leading edge owing to thermal deformation, such that they oppose the maintenance of a laminar boundary layer.

It is therefore an object of the present invention to specify an improved wing structure in the case of which the flow surface, despite thermal deformation, continues to promote a laminar boundary layer if in particular the wing leading edge has a protective layer composed of a material which has a considerably different coefficient of thermal expansion in relation to the material of the structural layer. In particular, it is the intention here for the exchangeability of the wing leading edge, and the principle of the differential design, to be maintained.

The object is achieved according to the invention by means of the wing structure as per claim 1.

Accordingly, a wing structure for flying objects is proposed, which has a wing leading edge and a wing box. Here, the wing leading edge of the wing structure has a structural layer composed of a first material and, arranged on said structural layer, a protective layer composed of a second material, wherein the second material differs from the first material, and wherein the outer surface of the protective layer forms the outer surface around which flow passes. The wing box has at least one wing shell, but preferably two diametrically opposite wing shells (top shell and bottom shell), wherein the wing leading edge is in particular detachably fastened to the wing box. As a result of the fastening of the wing leading edge to the wing box, for example to corresponding fastening elements such as spars or ribs, or as a result of the connection of the wing leading edge to one of the wing shells, the wing leading edge and the wing shell of the wing box together at least partially form the flow surface, around which flow passes, of the wing structure.

The wing leading edge and the at least one wing shell together form, on an outer side, a flow surface around which flow can pass, wherein an interior space which is delimited with respect to the outer side is formed in each case on an inner side.

It is thus for example conceivable for high-lift systems, such as for example the Krueger flaps, to be arranged in the interior space, in particular in the region of the wing leading edge, which are then pivoted out downward.

For the fastening of the wing leading edge to the wing box, the wing leading edge forms, on a first side which extends over the span width, a joining section which extends along the first side likewise over the span width and within which the wing leading edge is fastened to the wing box. In said joining section, therefore, the wing leading edge is fastened to the wing box such that the wing structure is formed and a flow surface is formed by wing leading edge and wing shell of the wing box. In a simplest embodiment, it is for example possible for an L-profile to be provided in the joining section, the second limb of which profile projects into the interior space of the wing structure and is fastened to a stiffening element or to the front spar of the wing box, as is disclosed for example in DE 10 2012 109 233 A1. A correspondingly formed surface offset resulting from the joining of wing leading edge and wing box may be compensated for example by means of a filling compound.

In classic aeronautics, the wing box of an airfoil has spars which run transversely with respect to the flow direction and which stabilize the airfoil over the span width, whereas ribs are provided which run transversely with respect thereto and normally substantially parallel to the flow direction, to which ribs the wing shells, for example, can be fastened. In the wing structure of the present invention, it is now provided that connecting elements which are provided substantially parallel to the flow direction in or on the wing box extend into the interior space of the wing leading edge, in order to thereby fasten the wing leading edge, in addition to a fastening in the joining section, also to the connecting elements of the wing box. Such connecting elements may for example be rib extensions of the wing box, which extend in the direction counter to the flow direction into the interior space of the wing leading edge.

According to the present invention, it is now the case that the wing leading edge is, in at least one fastening section, fastened by means of in each case one fastening element to the connecting elements, which project into the interior space of the wing leading edge, of the wing box, in order to thereby ensure a secure and stable connection of the wing leading edge to the wing box.

Furthermore, the wing leading edge has a nose section from which the wing leading edge extends in the direction of the wing box at a top side and at a bottom side, wherein the nose section defines in particular the transition from the top side to the bottom side and vice versa. The nose section is in this case characterized in particular by a corresponding nose radius which defines the curvature of the surface for the change from the top side to the bottom side.

According to the invention, it is now provided that, proceeding from the joining section of the wing leading edge, a fixing-free section extends in the direction of a second side, which is situated opposite the first side, of the wing leading edge at least as far as the nose section, within which fixing-free section the wing leading edge is not fastened to the connecting elements of the wing box with a fixing action in the direction of the outer side and of the inner side.

Thus, according to the invention, between the joining section at the first side of the wing leading edge and at least the nose section, the wing leading edge is not connected to the connecting element with a fixing action in the direction of the inner side and in the direction of the outer side, such that, in the fixing-free section, the wing leading edge is movable relative to the connecting elements in the direction of the inner side and in the direction of the outer side. Owing to the absence of such connections, it is possible, in the case of a wing leading edge which has two different materials, for thermally induced constraining forces, which generally always lead to a deformation of the flow surface and which have an adverse effect on the maintenance of a laminar flow of the boundary layer, to be avoided.

Owing to the fixing-free section of the wing leading edge, it is however possible for the flow surface to deform in said region, wherein, here, it has been identified that such a deformation specifically does not have an adverse effect on the maintenance of a laminar flow of the boundary layer, such that, despite a differential design of the wing structure and the use of fiber composite materials as a structural layer, the laminarity criteria of the wing structure can nevertheless be satisfied even if the wing structure is operated in the presence of extreme temperature differences.

Furthermore, in the case of the present invention, it has also been identified that, by means of such a connection concept, firstly the exchangeability of the wing leading edge can be ensured, and, secondly, the wing leading edge can nevertheless be fastened in a secure and stable manner to the wing box, even if a fixing-free section, in which specifically no connecting elements are provided, exists between the joining section and the nose section.

If one considers the fact that a temperature difference of over 80 Kelvin exists between the assembly of the wing leading edge and the operation of the aircraft at cruising height, it is specifically possible with the present invention to avoid a situation in which, at cruising height, the wing leading edge is thermally deformed such that the flow surface has an adverse effect on the maintenance of a laminar flow of the boundary layer. Here, if one also takes into consideration the production process for a wing leading edge based on a fiber composite material as a structural layer, a temperature range that must be taken into consideration exceeds 230 Kelvin.

As already mentioned above, it is particularly advantageous if the wing leading edge, as at least first material, has a fiber composite material, such that the structural layer of the wing leading edge is produced from fiber composite materials, whereas the protective layer of the wing leading edge, as second material, is a steel foil. Furthermore, it is very particularly advantageous if the wing box including the wing shells is likewise composed of a fiber composite material and has such a fiber composite material, such that the lightweight potential can be optimally utilized.

Specifically in the case of a fiber composite material being used for the structural layer and a steel foil being used as protective layer, thermally induced deformations of the wing leading edge occur, because the steel foil has a much higher coefficient of thermal expansion than the fiber composite material. Owing to the fixing-free section of the wing leading edge, the wing leading edge can deform in a homogeneous manner in said region, such that such a deformation does not adversely affect the maintenance of a laminar flow of the boundary layer.

It is therefore very particularly advantageous if the wing leading edge is not connected at all to the connecting elements, and is entirely unfastened, within the fixing-free section.

It is very particularly advantageous if only a single fastening section is provided, such that, regardless of the joining section, the wing leading edge has only a single fastening point per connecting element, by means of which the wing leading edge is fastened to the respective connecting element.

In an advantageous embodiment, at least some of the fastening elements of the fastening section are support elements which are connected in each case at a first fastening point to the wing leading edge and at a second fastening point to the respective connecting element, such that the wing leading edge is fastened to the respective connecting element with a predefined spacing between the first and the second fastening point. A support element of said type may for example be a swivel support. It is advantageous for all fastening elements to be such support elements, such that the wing leading edge is always arranged with a predefined spacing to the respective connecting element.

The support element may in this case be of rigid or length-adjustable design, in order to thus for example be able to compensate tolerances during the assembly process or in order to compensate spacing deviations between the first and second fastening points. Furthermore, the support element may in particular be of rectilinear form.

In an advantageous embodiment, it is provided that one or more support elements is or are articulatedly connected in each case at the first fastening point to the wing leading edge with the formation of a first joint and/or at the second fastening point to the connecting element with the formation of a second joint, such that the wing leading edge is movable relative to the connecting element in the fastening section. In this way, it can be achieved that thermally induced deformations of the wing leading edge are converted into a slight rotational movement in the fastening section, such that the wing leading edge is basically rendered free from constraining forces in the direction of the outer side and inner side of the wing leading edge. Furthermore, such an embodiment permits very simple mounting/dismounting of the wing leading edge.

Here, it is very particularly advantageous if each fastening element is a support element which is articulatedly connected both to the wing leading edge and to the respective connecting element.

To ensure the simplest possible assembly and in particular force-free connection of the wing leading edge, it is particularly advantageous if one of the joints has a rotatably mounted eccentric bushing through which the joint spindle is guided. By rotating the eccentric bushing, it is thus possible for the spacing between the first and the second fastening point to be set in a variable manner, which is particularly advantageous in particular in the case of rigid support elements. In this way, manufacturing tolerances and other shape deviations can be compensated without greatly increasing the assembly outlay.

To prevent an inadvertent rotation of the eccentric bushing during flight operation, it is furthermore advantageously provided that the eccentric bushing is in engagement with a securing element, the position of which relative to the connecting element or the wing leading edge, depending on which fastening point has the eccentric bushing as a joint, is fixed, such that the eccentric bushing itself is rotationally fixed. It is thus for example conceivable for the eccentric bushing to have a polygonal, for example hexagonal, circumference, wherein the securing element engages in positive locking fashion in said polygonal circumference and thus rotationally fixes the eccentric bushing if the securing element is likewise positionally fixed or immovably fixed.

In a further advantageous embodiment, it is provided that at least one of the support elements is a first support element which has a further, second support element, such that the wing leading edge is, in the fastening section, fastened in the manner of a 3-point bearing to the fastening element. For this purpose, the second support element is connected at a third fastening point to the first support element and at a fourth fastening point to the connecting element, wherein the second fastening point of the first support element and the fourth fastening point of the second support element, which are both provided on the connecting element, are provided in a spaced-apart manner.

Here, the second support element is oriented substantially parallel to the connecting elements of the wing box and is intended to prevent a rotational movement about a bearing point relative to the first support element, in order to thus impart more stability to the wing leading edge at certain points.

It is thus for example conceivable for a second support element of the abovementioned type to be provided at regular or irregular intervals in each case with respect to the first support element, in order to stabilize the wing leading edge at regular intervals in the flow direction.

In a very particularly advantageous embodiment, the second support element is in this case of length-adjustable form, such that the spacing between the third and the fourth fastening point is adjustable. The second support element may thus be formed for example in the manner of a turnbuckle, such that in particular manufacturing tolerances or deviations from the actual assembly dimensions can hereby be compensated, while simultaneously ensuring stability of the wing leading edge.

In one embodiment, it is however also possible for the first and third fastening points to coincide.

With the second support element, therefore, the fastening element of the respective connecting element is supplemented by an additional support in the longitudinal direction of the connecting element, whereby, for example in the case of a length-adjustable form, an adjustment of said support with regard to the gap to the Krueger flap can be performed.

In a more specific refinement, the wing structure has a wing leading edge in the case of which the joining section at the first side of the wing leading edge is situated at the top side of the wing leading edge and the fastening section is situated at the bottom side of the wing leading edge, wherein the fixing-free section extends from the joining section at the top side via the nose section to the fastening section at the bottom side, wherein said fastening section could also be part of the nose section.

This is advantageous in particular in the case of wing structures which have high-lift systems, such as for example a Krueger flap, which is pivoted out or deployed from the bottom side of the wing leading edge. Thus, the wing leading edge is fastened both firstly at the top side at the first end to the wing box, in order to thus form the continuous flow surface, around which flow can pass in a laminar manner, of wing leading edge and wing upper shell, and secondly to a fastening section which is situated on the bottom side of the wing leading edge and which is in this case connected to the connecting element only via a single fastening point. In this way, the fixing-free section is selected to be as long as possible, such that the occurrence of fixing-induced constraining forces can be virtually eliminated.

In a further embodiment, it may be provided that the fastening section is situated in an end section at the second side, situated opposite the first side, of the wing leading edge. It is thus for example conceivable for the joining section at the top side to be arranged at the first end of the wing leading edge, whereas the fastening section is situated, at the second side situated opposite the first side, in an end section of the bottom side, wherein the end section could for example constitute the transition to the high-lift systems or to the wing lower shell.

Furthermore, according to the invention, a method for exchanging a wing leading edge in the case of a wing structure as specified above is provided, wherein, firstly, the fastenings by means of which the wing leading edge is fastened to the wing box in the joining section of the wing leading edge and the fastening elements by means of which the wing leading edge is fastened to the connecting element in the fastening section are released, and, subsequently, the wing leading edge to be exchanged is removed from the wing structure. Subsequently, a provided substitute wing leading edge, which is intended to replace the old wing leading edge, is positioned on the wing structure, and then the corresponding fastenings or fastening elements are connected.

If an eccentric bushing is provided at one of the fastening points, said eccentric bushing is rotated until the elements can be connected in a force-free manner.

The invention will be discussed in more detail by way of example on the basis of the appended figures, in which.

Figure 1:
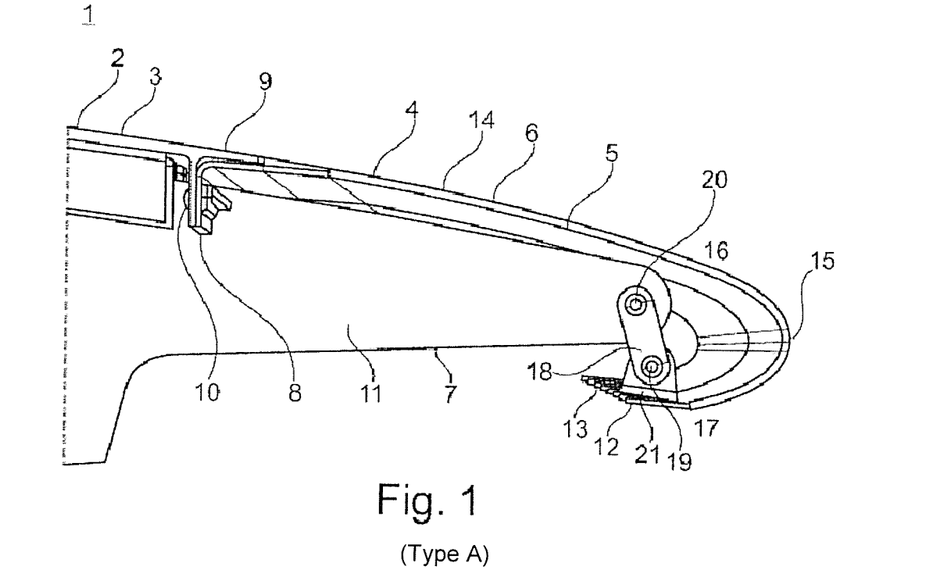
FIG. 1 shows a first variant of a fastening of the wing leading edge.

FIG. 1 shows a first variant of the wing structure 1 according to the invention. The wing structure 1 has a wing box 2 which has an upper wing shell 3. The lower wing shell is not illustrated in the exemplary embodiment of FIG. 1.

The wing box is adjoined in the direction opposite to the flow direction by a wing leading edge 4, which forms the front termination of the wing structure 1. The wing leading edge 4 has a structural layer 5 which is composed of a fiber composite material or has such a fiber composite material, and a protective layer 6 which is arranged above said structural layer and which may for example be a steel foil. Here, the protective layer 6 serves for protecting the structural layer 5 against erosion, and is intended in particular to prevent damage to the structural layer 5 during flight operation.

Together with the outer side of the upper wing shell 3, the outer side of the protective layer 6 ultimately forms the flow surface, around which flow can pass, of the wing structure 1, wherein, as will be presented in more detail further below, the wing structure 1 is, with its outer flow surface, intended in particular to maintain a laminar boundary layer flow.

Figure 2:
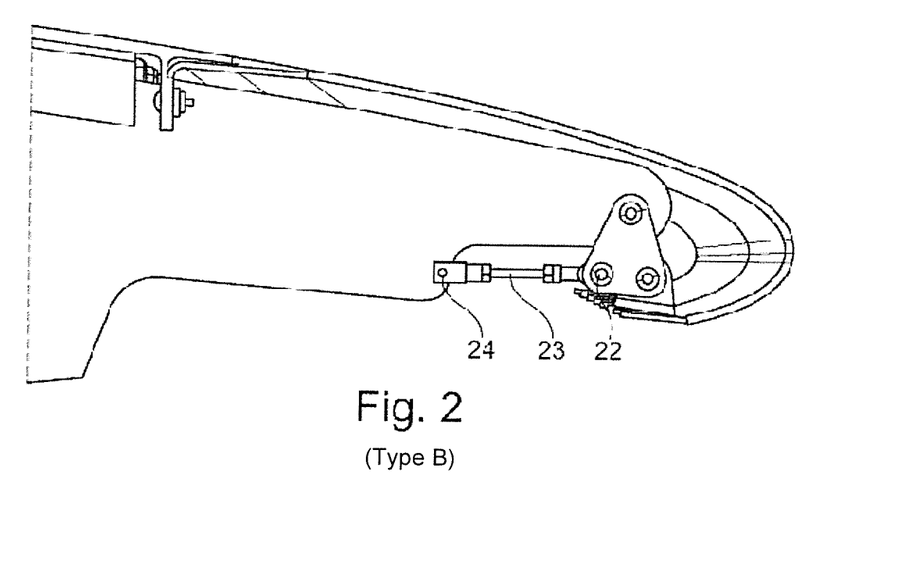
FIG. 2 shows a second variant of a fastening of the wing leading edge.

Here, the upper wing shell 3 and the wing leading edge 4 form in each case one interior space 7 which is delimited with respect to the outer side and which may contain functional assemblies important for flight operation. Here, the illustration selected in FIGS. 1 and 2 shows a wing structure 1 in a cross-sectional illustration, such that the extent of the wing structure 1 over the span width leads out of the drawing plane.

The wing leading edge 4 has, at a first side 8, a joining section 9 by means of which the wing leading edge 4 is fastened to the wing box 2. The fastening of the wing leading edge 4 to the wing box 2 may be fastened for example by fastening of the wing leading edge 4 to stiffening elements 10 of the upper wing shell 3. The joining section 9 thus forms the parting point for the joining of the wing leading edge 4 to the wing box 2, in particular to the upper wing shell 3, and is thus intended to form a stable transition from the flow surface of the wing leading edge 4 to the flow surface of the wing box 2, in particular of the upper wing shell 3.

In the exemplary embodiment of FIG. 1, a stiffening element 10 of the upper wing shell 3 projects into the interior space 7 of the wing structure 1, wherein, in the joining section 9 of the wing leading edge, a part of the wing leading edge 4 projects, parallel to the stiffening element 10 of the upper wing shell 3, likewise at an angle into the interior space 7, such that the wing leading edge 4 can, by means of the L-profile thus formed in the joining section 9, be fastened in particular detachably to the stiffening element 10 of the upper wing shell 3.

To accommodate longitudinal forces counter to the flight direction or flow direction, it is necessary for the wing leading edge 4 to be fastened at least one further fastening point. For this purpose, connecting elements 11 project, proceeding from the wing box 2, into the interior space 7 of the wing leading edge 4, in order for the wing leading edge 4 to thus be fastened to the connecting elements 11 at least one fastening point. Such connecting elements may for example constitute rib extensions of ribs of the wing box 2.

For the fastening of the wing leading edge 4 to the connecting elements 11, the wing leading edge 4 has at least one fastening section 12, which is provided at a second side 13 situated opposite the first side 8. Here, in the exemplary embodiment of FIG. 1, the second side 13 of the wing leading edge 4 constitutes an end section.

Proceeding from the joining section 9 at the first side 8, therefore, a fixing-free section 14 extends in the direction of the fastening section 12 at the second side 13, within which fixing-free section the wing leading edge 4 is not connected to the connecting elements 11. Owing to the fact that the wing leading edge 4 has a protective layer 6 composed of a material which has a considerably different coefficient of thermal expansion in relation to the material of the structural layer 5, thermally induced deformations occur during flight operation, because the material composition acts similarly to a bimetal element. Owing to the absence of further fastening points of the wing leading edge 4 to the connecting elements 11, the wing leading edge 4 is thus, in the fixing-free section 14, rendered free from constraining forces in the direction of the inner side and outer side of the wing leading edge 4, such that, in the fixing-free section, the wing leading edge 4 can as a whole undergo thermally induced deformation. Here, the surface contour of the wing leading edge 4 is substantially maintained, such that a deformation of said type promotes the maintenance of a laminar flow.

Here, as viewed from the joining section 9, the fastening section 12 is arranged behind a nose section 15, such that, in the exemplary embodiment of FIG. 1, the fixing-free section 14 extends from the joining section 9 via the nose section 15 as far as the fastening section 12. Here, the nose section 15 of the wing leading edge 4 defines the foremost part of the wing leading edge 4, and is described in particular by its nose radius, wherein a top side and a bottom side extend from the nose section 15 in the direction of the wing box. Here, the top side of the wing leading edge 4 ends at the joining section 9, whereas the bottom side in the exemplary embodiment of FIG. 1 ends at the fastening section 12 at the second side 13 of the wing leading edge 4, wherein the gap formed here between the fastening section 12 and the lower wing shell (not illustrated) of the wing box 2 is closed by a Krueger flap construction.

Here, according to the invention, the fixing-free section extends at least as far as the nose section 15, such that the entire top side 16 of the wing leading edge 4 forms the fixing-free section.

In the fastening section 12, the wing leading edge 4 is connected to the illustrated connecting element 11 in the form of a swivel support 18 (support elements), wherein the swivel support 18 is connected at a first fastening point 19 to the wing leading edge 4 and at a second fastening point 20 to the connecting element 11. Here, the swivel support 18 is fastened in each case articulatedly at the first fastening point 19 and the second fastening point 20, such that the swivel support is mounted in each case so as to be rotatable about the respective fastening point. The swivel support can thus rotate about its respective fastening point 19 or 20 in the plane of the connecting element 11.

As a result of the articulated mounting of the swivel support 18 at the respective fastening points 19 and 20, thermal deformations of the wing leading edge 4 in the fixing-free section can be compensated by means of a compensation movement of the wing leading edge 4 in the plane of the connecting elements 11.

In the exemplary embodiment of FIG. 1, the swivel support 18 is in particular of rigid form, such that a constant spacing exists between the first fastening point 19 and the second fastening point 20.

Here, the first fastening point 19 is formed by a swivel support connection 21 which projects into the interior space 7 at the wing leading edge 4, which swivel support connection may for example be formed integrally with the structural layer 5 of the wing leading edge 4, or may be adhesively bonded or fastened in some other non-detachable manner to said structural layer. Here, the swivel support holder 21 of the wing leading edge 4 projects into the interior space 7 in particular parallel to the connecting elements 11, such that the connecting element 11 and the swivel support holder 21 corresponding thereto form a plane, such that the swivel support 18 can connect the connecting element 11 and the respective swivel support holder 21 to one another.

The joints formed in each case by the fastening points 19 and 20 for the rotatable mounting of the swivel support 18 may for example be formed such that a spindle element (not illustrated) is guided through bores in each case in the swivel support 18 and in the connecting element 11 and in the swivel support holder 21. For this purpose, it is for example conceivable, as will be discussed further below, for eccentric bushings to be provided in the bores, which eccentric bushings, by being rotated, permit tolerance compensation of the bores.

FIG. 2 shows a further variant of the fastening of the wing leading edge 4 to the connecting element 11 in the fastening section 12, in the case of which the swivel support 18 has a third fastening point 22, at which a further support element 23 is arranged, which is likewise arranged on the connecting element 11 at a fourth fastening point 24. Thus, both the second fastening point 20 and the fourth fastening point 24 are provided on the connecting element 11, such that the wing leading edge is connected to the connecting element 11 via the swivel support 18 and the further support element 23 by means of the swivel support holder 21.

In the exemplary embodiment of FIG. 2, the further support element 23 is formed in the manner of a turnbuckle, such that it is variable in length, for example by means of a combination of a right-handed thread and a left-handed thread at its ends. Through the variation in length of the further support element 23, it is possible here for the position of the second side 13 of the wing leading edge 4 to be varied, whereby it is for example possible for the gap to the Krueger flap construction to be adjusted.

Both the second fastening point 20 and the fourth fastening point 24 are arranged in a spaced-apart manner on the connecting element 11, so as to yield a stable 3-point bearing arrangement. Here, the further support element 23 is oriented substantially in the longitudinal direction (x axis of the aircraft in the coordinate system fixed with respect to the aircraft), such that the wing leading edge 4 is variably adjustable in the longitudinal direction. The further support element 23 thus lies substantially parallel to the flow or flight direction. In particular, the further support element 23 is substantially parallel to the connecting element 11.

As can be seen, all the fastening elements for the fastening of the wing leading edge 4 to the wing box 2 are provided in the interior space 7 of the wing structure 1, such that, in the present wing structure, the leadthrough of connectors or fastening means through the flow surface can be dispensed with entirely. This firstly permits a laminar flow around the flow surface that is formed, on the one hand, and also a straightforward and flexible exchange of the wing leading edge, on the other hand. Owing to the materials used, and associated thermally induced deformation processes, it is furthermore possible with the aid of the present invention for surface deformations which are adverse with regard to a laminar flow to be avoided, because occurring thermally induced deformations can form freely in the fixing-free section 14 of the wing leading edge.

Figure 3:
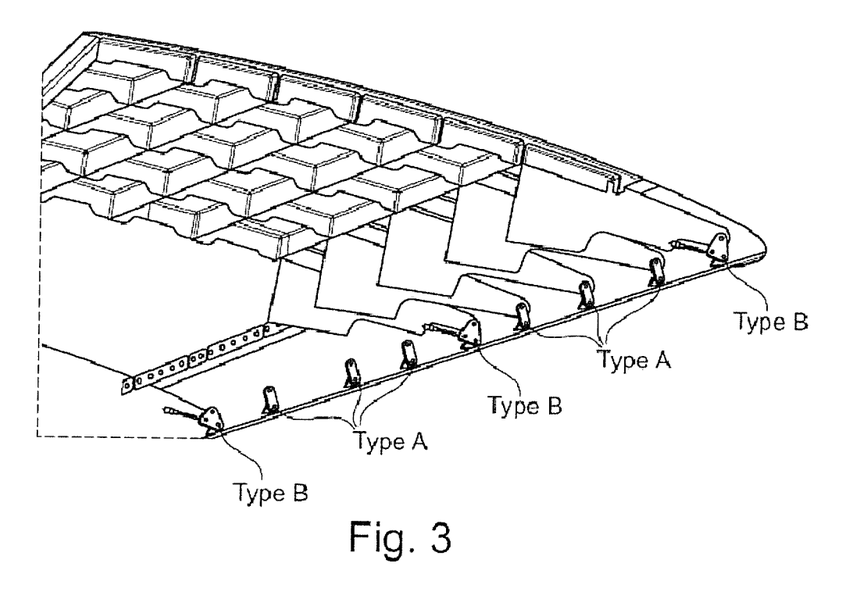
FIG. 3 is a perspective illustration of the wing structure according to the invention.

FIG. 3 once again shows a perspective illustration of the wing structure 1, showing the rib connections of the wing leading edge. As can be seen, the two variants of the connection of the wing leading edge to the ribs are provided in an alternating manner over the entire span width, such that a region with only in each case one support element is followed by a connection of the wing leading edge to the respective rib by means of in each case one further support. In the exemplary embodiment of FIG. 3, it is provided here that every fourth rib is connected to the wing leading edge by means of a swivel support with turnbuckle.

Figure 4:
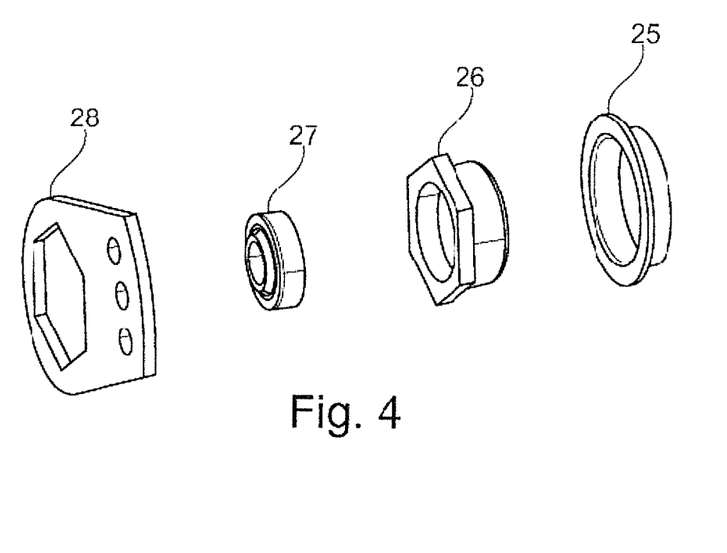
FIG. 4 shows the construction of an articulated bearing arrangement at the rib connection.

FIG. 4 shows, by way of example, the construction of a fastening point 19 of the swivel support to the connecting element 11. This concept, shown in FIG. 4, is self-evidently transferable to the other fastening points. Here, the fastening point 19 firstly has a protective bushing 25, which is adhesively bonded into the bore of the connecting element 11. Then, an eccentric bushing 26 is arranged in a rotatably mounted manner in the protective bushing 25, such that the joint spindle can be set with different spacings to the respectively corresponding other fastening point. The eccentric bushing 26 has, on its circumference, a polygonal engagement surface by means of which the eccentric bushing 26 can be placed in engagement with a securing element 28. Finally, a bearing 27 is also inserted into the eccentric bushing 26 in order to be able to correspondingly support the joint spindle.

Figure 5:
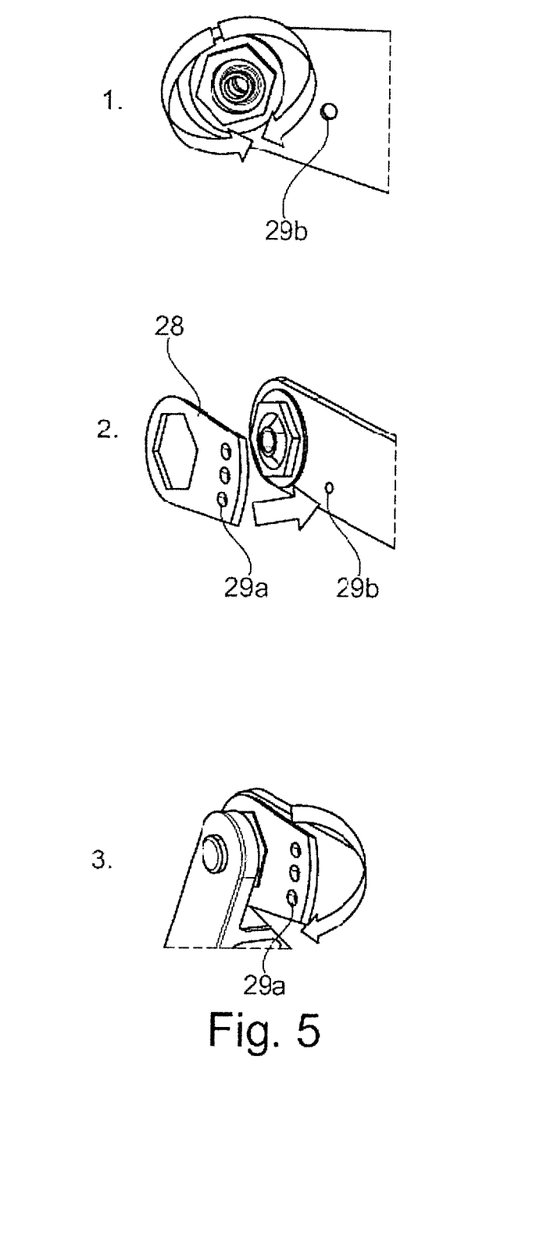
FIG. 5 is an illustration of a stepped tolerance compensation at the rib connection.

FIG. 5 shows the steps for tolerance compensation by means of the rotatably mounted eccentric bushing 26. Firstly, the position of the eccentric 26 is freely set, as can be seen in the figure on the far left. Subsequently, the securing element 28 is placed in engagement with the outer circumference of the eccentric bushing 26, as shown in the central illustration. Subsequently, the swivel support is connected by means of a bolt to the fastening point 19, such that the swivel support is arranged on the rib connection.

The fine adjustment is then performed. For this purpose, one of the bores 29a provided in the securing element 28 is placed in overlap with a partner bore 29b on the connecting element 11, and said securing element position is fixed by means of a pin, a screw, a rivet or a similar suitable securing element. The bores in the securing element 28 may in this case be arranged such that, between the various divisions of the hexagon (in each case 60°), further subdivisions into 15° steps are possible. The securing of the eccentric position is thus selectable not in a continuously variable manner but in a very finely graduated manner. The fineness of the subdivision may in principle be selected as desired in the design of the securing element.

Figure 6:
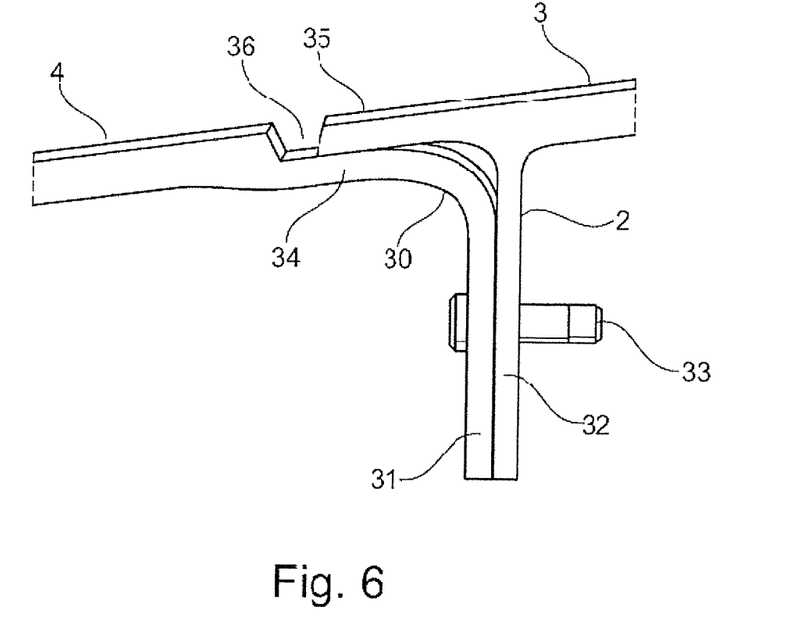
FIG. 6 shows an exemplary embodiment of a connecting arrangement in the joining section.

FIG. 6 shows a connecting arrangement in the joining region 9, in which the wing leading edge 4 is connected to the wing box 2. The wing leading edge 4 forms in this case an integrally formed L-profile 30, which projects with a first limb 31 into the interior space of the wing leading edge. Here, "integrally formed" means that the L-profile is formed with the structural layer of the wing leading edge 4 in particular without a joining point. In particular, the L-profile 30 is formed from the fiber composite material of the structural layer of the wing leading edge 4, wherein, here, the fibers of the structural layer are laid so as to extend into the L-profile. The first limb 31 of the L-profile 30 is provided so as to project into the interior space so as to bear in positively locking fashion against a stiffening element 32 of the wing shell 3 of the wing box 2. Such stiffening elements 32 may for example be stringers. It is also conceivable for the integrally formed L-profile 30 to be fastened with its first limb 31 to the front spar of the wing box.

By means of a fastening 33, the L-profile 30 is then arranged fixedly on the stiffening element 32, for example with the aid of a threaded bolt or a rivet connection.

As shown in FIG. 6, the L-profile forms a second limb 34, which is oriented initially parallel to the wing shell 3. The second limb 34 is in this case formed so as to be offset into the interior space, such that the second limb 34 can be pushed under an overhang 35 of the wing shell 3. This results in a very stable and firm connection. A surface offset 36 formed at the parting point between the surface of the wing leading edge and the surface of the wing shell 3 may for example be filled with a filler material.

The integrally formed L-profile 30 may in this case likewise extend over the span width of the entire wing leading edge 4, wherein, here, the span width constitutes the dimension out of the drawing plane of FIG. 6. Here, the L-profile 30 may be interrupted at certain positions over the span width in order to thus enable the connecting elements (not illustrated in FIG. 6) from the other figures to extend into the interior space of the wing leading edge.

With the L-profile being formed integrally from the material of the structural layer of the wing leading edge 4, it is thus furthermore likewise possible to avoid a situation in which connecting elements for the connection of the wing leading edge to the wing shell or to the wing box are led through the flow surfaces in the joining section 9 of the wing structure 1. Rather, all fastenings are situated in the interior space of the wing structure and thus cannot adversely affect the laminar flow around the wing structure.

The stiffening element 32 self-evidently extends, likewise over the span width, in the form of an L-profile holder, such that the L-profile can, over the span width, be fastened by means of numerous fastenings 33 to the L-profile holder 32.

Accordingly, in the joining section 9, a connecting arrangement is provided for connecting the wing leading edge to the wing box, wherein the wing leading edge has an L-profile which projects into the interior space and which is formed integrally with the structural layer of the wing leading edge, wherein the wing box, in particular the wing shell of the wing box, has an L-profile holder which is arranged in the interior space and to which the integrally formed L-profile of the wing leading edge can be fastened by internally situated fastening means, wherein the L-profile and the L-profile holder extend over the span width transversely with respect to the flow direction.

Here, it is conceivable for the integrally formed L-profile to be angled with a second limb in the direction of the interior space at an angle with respect to the flow surface, such that a surface offset is formed between the flow surface of the wing shell and the flow surface of the wing leading edge, into which surface offset there is inserted a wedge-shaped filler element which forms a part of the flow surface of the wing structure. Said wedge-shaped filler element may in this case also be covered by the protective layer in the form of a steel foil.

The transition between the flow surface of the wing leading edge and the flow surface of the wedge-shaped filler element and the transition between the flow surface of the wedge-shaped filler element and the flow surface of the wing shell are in this case substantially flat, wherein a gap at the transition between the flow surface of the wedge-shaped filler element and the flow surface of the wing shell is filled with a filler material.

The wing leading edge is advantageously angled in the direction of the interior space at a tangential elongation of the flow surface of the wing shell, such that, by means of the wedge-shaped filler element, a harmonious flow surface is formed despite the integrally formed L-profile.

In an advantageous embodiment, the L-profile 30 and the L-profile holder 32 each have a multiplicity of bores, which overlap one another in each case in pairwise fashion for the leadthrough of a fastening 33, wherein, in each bore pair, at least two rotatably mounted eccentric bushings are provided for enabling a deviation of the bore center of a bore of a bore pair to be compensated.

In this way, it is possible, despite tolerance deviations of the bores of the bore pairs, for the wing leading edge to be fastened to the wing box quickly and securely without the need for the bores required for the leadthrough of the fastenings 33 to be re-drilled during maintenance operation. Rather, slight deviations from the bore center are compensated by rotation of the two eccentric bushings inserted one inside the other.

Here, it is advantageous for one of the bores of a respective bore pair to have a larger radius than the other bore of the respective bore pair.

It is also conceivable for one of the eccentric bushings to be inserted into the first bore and the other eccentric bushing to be inserted into the second bore of the bore pair.

LIST OF REFERENCE DESIGNATIONS

1 Wing structure
2 Wing box
3 Upper wing shell
4 Wing leading edge
5 Structural layer of the wing leading edge
6 Protective layer of the wing leading edge
7 Interior space
8 First side of the wing leading edge
9 Joining section
10 Stiffening element/L-profile holder
11 Connecting element/rib extensions
12 Fastening section
13 Second side of the wing leading edge
14 Fixing-free section
15 Nose section
16 Top side of the wing leading edge
17 Bottom side of the wing leading edge
18 Support element/swivel support
19 First fastening point
20 Second fastening point
21 Swivel support holder
22 Third fastening point
23 Second support element/turnbuckle
24 Fourth fastening point
25 Protective bushing
26 Eccentric bushing
27 Bearing
28 Securing element
29*a* Bore in the securing element
29*b* Partner bore
30 L-profile
31 First limb of the L-profile
32 L-profile holder/stiffening element
33 Fastening
34 Second limb of the L-profile
35 Overhang of the wing shell
36 Surface offset

The invention claimed is:

1. A wing structure for flying objects, comprising:
a wing leading edge which has a structural layer composed of at least one first material and, arranged on said structural layer, a protective layer composed of a second material which differs from the first material;
a wing box to which the wing leading edge is fastened, wherein the wing box has at least one wing shell,
wherein the wing leading edge and the at least one wing shell together form, on an outer side, a flow surface around which flow can pass and, on an inner side, each of the wing leading edge and the at least one wing shell have an interior space which is delimited with respect to the outer side,
wherein the wing leading edge forms, on a first side, a joining section which extends over a span width and within which the wing leading edge is fastened to the wing box,
wherein the wing box has, in the interior space, a multiplicity of connecting elements which extend into the interior space of the wing leading edge,
wherein the wing leading edge is, in at least one fastening section, fastened by fastening elements to at least some of the multiplicity of connecting elements of the wing box which project into the interior space of the wing leading edge, and
wherein the wing leading edge forms a nose section from which the wing leading edge extends in a direction of the wing box at a top side and at a bottom side,
wherein, proceeding from the joining section of the wing leading edge, a fixing-free section extends in a direction of a second side, wherein the second side is situated opposite the first side, of the wing leading edge at least as far as the nose section, and within the fixing-free section the wing leading edge is not fastened to the multiplicity of connecting elements of the wing box with a fixing action in a direction of the outer side and of the inner side.

2. The wing structure as claimed in claim 1, wherein the at least one first material of the structural layer of the wing leading edge is a fiber composite material or is composed of the fiber composite material, wherein the second material of the protective layer of the wing leading edge is a steel foil.

3. The wing structure as claimed in claim 1, wherein the wing leading edge is not fastened to the multiplicity of connecting elements within the fixing-free section.

4. The wing structure as claimed in claim 1 wherein at least some of the fastening elements of the fastening section are support elements which are each connected at a first fastening point to the wing leading edge and at a second fastening point to a respective connecting element of the multiplicity of connecting elements such that the wing leading edge is fastened to the respective connecting element with a predefined spacing between the first fastening point and the second fastening point.

5. The wing structure as claimed in claim 4, wherein one or more of the support elements are of length-adjustable form, such that a spacing between the first fastening point and the second fastening point is adjustable.

6. The wing structure as claimed in claim 4, wherein one or more of the support elements is or are articulatedly connected in each case at the first fastening point to the wing leading edge with the formation of a first joint and/or at the second fastening point to the connecting element with the formation of a second joint, such that the wing leading edge is movable relative to the connecting element in the fastening section.

7. The wing structure as claimed in claim 6, wherein at least one of the joints has a rotatably mounted eccentric bushing through which a joint spindle is guided.

8. The wing structure as claimed in claim 7, wherein the rotatably mounted eccentric bushing is in engagement with a securing element, wherein a position of engagement relative to the connecting element or the wing leading edge is fixed, such that the eccentric bushing is rotationally fixed.

9. The wing structure as claimed in claim 4 wherein the at least one support element includes is a first support element and a second support element which is connected at a third fastening point to the first support element and wherein the at least one support element is connected at a fourth fastening point to the connecting element, wherein the second fastening point of the first support element and the fourth fastening point of the second support element are provided in a spaced-apart manner on the connecting element.

10. The wing structure as claimed in claim 9, wherein the first support element is of length-adjustable form, such that a spacing between the first fastening point and the second fastening point is adjustable, and/or wherein the second support element is of a length-adjustable form, such that a spacing between the third fastening point and the fourth fastening point is adjustable.

11. The wing structure as claimed in claim 9, wherein the first fastening point and the third fastening point coincide.

12. The wing structure as claimed in claim 1 wherein the joining section at the first side of the wing leading edge is situated at the top side of the wing leading edge and the fastening section is situated at the bottom side of the wing leading edge, wherein the fixing-free section extends from the joining section at the top side via a nose section to the fastening section at the bottom side.

13. The wing structure as claimed in claim 1 wherein the fastening section is situated in an end section at the second side, situated opposite the first side, of the wing leading edge at the bottom side of the wing leading edge.

14. A method for exchanging the wing leading edge of the wing structure as claimed in claim 1, comprising the steps of:
 a) releasing the fastenings by means of which the wing leading edge is fastened to the wing box in the joining section of the wing leading edge, releasing the fastening elements by means of which the wing leading edge is fastened to the connecting elements in the fastening section of the respective connecting elements, and removing the wing leading edge from the wing structure;
 b) connecting a substitute wing leading edge to the connecting elements within the fastening sections by fastening the fastening elements to the substitute wing leading edge and to the connecting elements; and
 c) connecting the substitute wing leading edge to the wing box within the joining section by means of fastenings.

15. A method for exchanging the wing leading edge of the wing structure as claimed in claim 7, comprising the steps of:
 a) releasing the fastenings by means of which the wing leading edge is fastened to the wing box in the joining section of the wing leading edge, releasing the fastening elements by means of which the wing leading edge is fastened to the connecting elements in the fastening section of the respective connecting elements, and removing the wing leading edge from the wing structure;
 b) connecting a substitute wing leading edge to the connecting elements within the fastening sections by fastening the fastening elements to the substitute wing leading edge and to the connecting elements; and
 c) connecting the substitute wing leading edge to the wing box within the joining section by means of fastenings,
 wherein during the connection of the wing leading edge to the connecting elements within the fastening sections, the respective eccentric bushing is rotated until bores in the support element and in the connecting element for the joint spindle of the respective joint are brought into overlap, wherein the joint spindle is subsequently inserted.

* * * * *